R. VOSE.
Car Spring.

No. 38,642.

3 Sheets—Sheet 1.

Patented May 19, 1863.

Witnesses:
Randolph Carter Jr.
A. Ho. Smith

Inventor:
Richard Vose
By Robbins & Burr
Att'ys

R. VOSE.
Car Spring.

No. 38,642.

3 Sheets—Sheet 2.

Patented May 19, 1863.

Witnesses:

Inventor:
Richard Vose
By Robbins & Burr
Attys

R. VOSE.
Car Spring.

No. 38,642. 3 Sheets—Sheet 3. Patented May 19, 1863.

Witnesses:
Randolph Leigh Jr
A. Thos Smith

Inventor:
Richard Vose
By Robbins & Burr
Atty's

UNITED STATES PATENT OFFICE.

RICHARD VOSE, OF NEW YORK, N. Y., ASSIGNOR TO METALLIC CAR-SPRING COMPANY.

IMPROVEMENT IN CAR-SPRINGS.

Specification forming part of Letters Patent No. 38,642, dated May 19, 1863.

*To all whom it may concern:*

Be it known that I, RICHARD VOSE, of the city, county, and State of New York, have invented a new and useful Improvement in Railroad-Car Springs; and I do hereby declare that the following is a full and complete description of the same, reference being had to the accompanying drawings, forming a part of this specification, of which—

Figure 1:
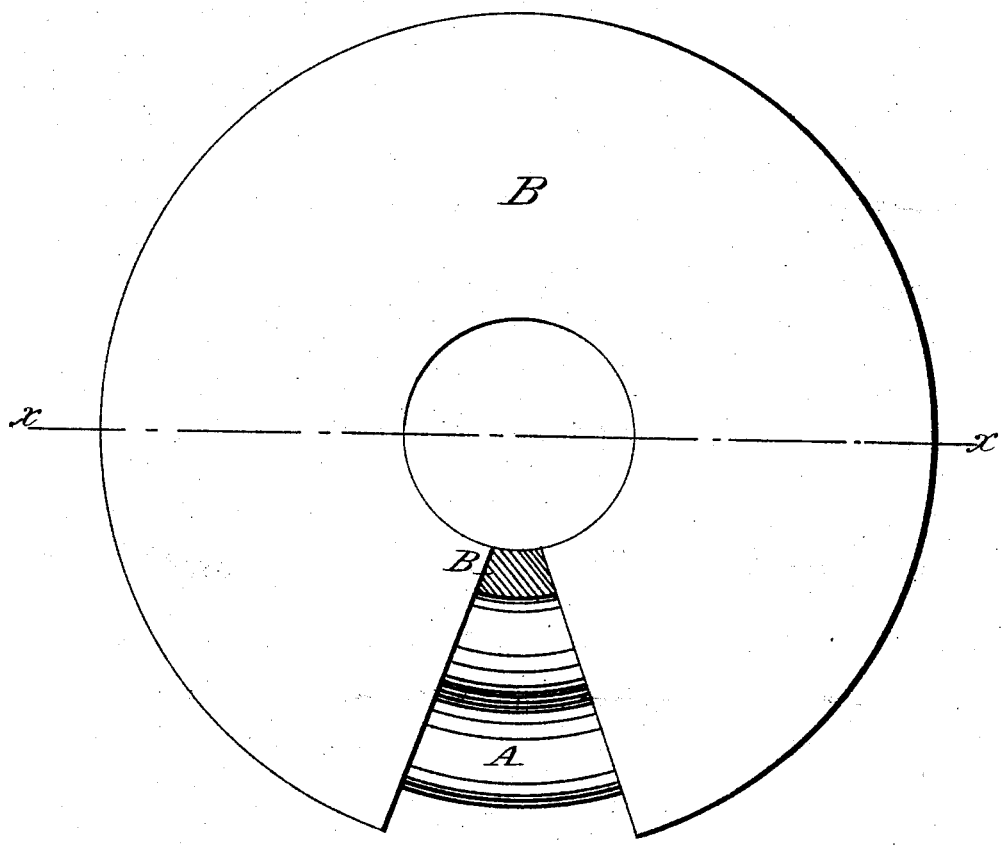
Figure 2:
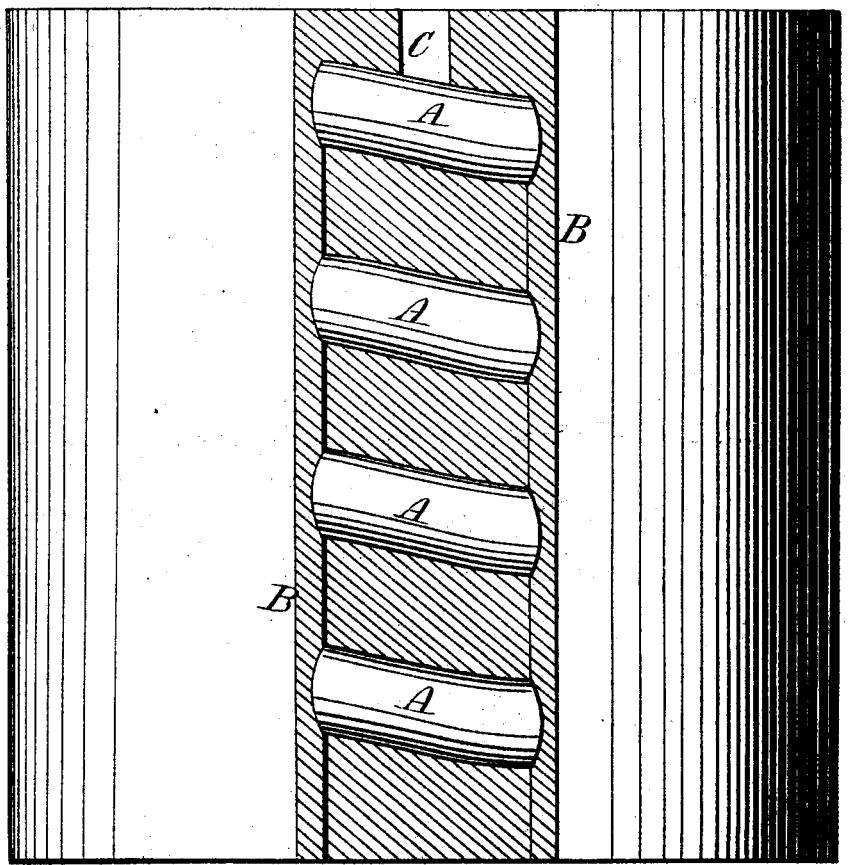
Figure 3:
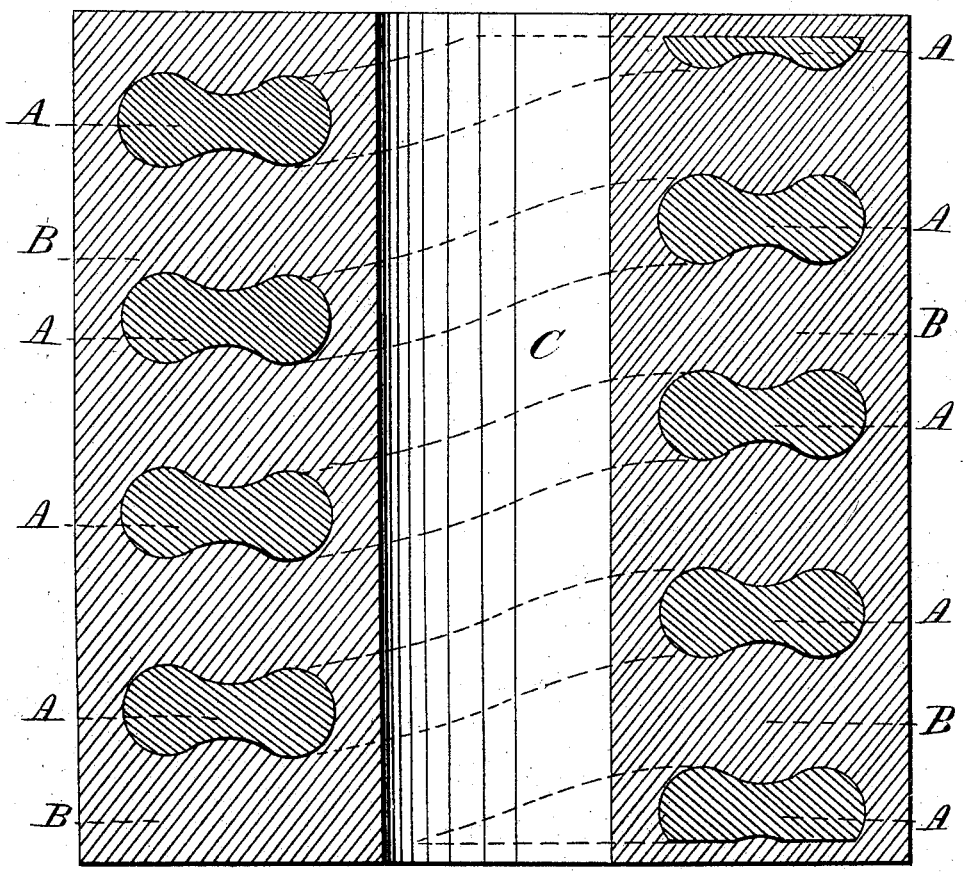

Figure 1 is a top view of my improved spring with a section thereof cut away to illustrate its peculiar combination. Fig. 2 is a side elevation of the same, with a portion of its rubber casing cut away, so as to show the metallic spring embedded therein; and Fig. 3 is a transverse section thereof in the line $x\,x$ of Fig. 1.

The nature of my invention consists in uniting and combining in a compact form the qualities of both an elastic india-rubber or gutta-percha block spring and a metallic spiral or helical spring. To accomplish this object I take a metallic helical (or spiral) spring, A, of the best temper and quality and of any desirable size, and embed or inclose it completely in a mass of sulphurized india-rubber or gutta-percha, B, while it is in a soft and plastic condition. After the metallic spring has thus been completely buried in and enveloped by the softened gum the exterior of the mass is formed and molded into a cylindrical shape, as represented in the accompanying drawings, care being taken that the coating of gum outside of the metallic spring shall be as nearly as possible uniform in thickness. An aperture, C, is also formed longitudinally through the rubber in the center of the metallic coil to receive a retaining-bolt. When the elastic gum enveloping the metallic spring has been fashioned and finished in the form above described, or in any shape or form which may be found desirable, it is cured by heating at a proper temperature, according to the process patented by Mr. Goodyear, or by any other known formula for the vulcanization of india-rubber, until it has obtained a proper degree of toughness and elasticity. Springs thus formed have proven upon experiment to be the most powerful, of a given size and weight, ever yet discovered, and their peculiar constitution serves to render them the most durable as well as reliable springs known.

What I claim as my invention, and desire to secure by Letters Patent, is—

A compound spring formed of a helical or spiral coil of elastic metal embedded in a mass of elastic india-rubber or gutta-percha, substantially in the manner and for the purpose herein set forth.

The foregoing specification of my improved embedded spiral spring signed by me this 24th day of March, A. D. 1863.

RICHD. VOSE.

In presence of—
CHARLES D. GIBSON,
CHARLES ELY.